United States Patent
Kruse et al.

(10) Patent No.: US 9,007,008 B2
(45) Date of Patent: Apr. 14, 2015

(54) METHOD FOR CONTROLLING THE OPERATION OF AN ARRANGEMENT OF AT LEAST TWO ELECTRIC MACHINES, AND MOTOR VEHICLE

(71) Applicant: Audi AG, Ingolstadt (DE)

(72) Inventors: Alexander Kruse, Ingolstadt (DE); Tobias Schneider, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/360,212

(22) PCT Filed: Oct. 26, 2012

(86) PCT No.: PCT/EP2012/004480
§ 371 (c)(1),
(2) Date: May 22, 2014

(87) PCT Pub. No.: WO2013/075778
PCT Pub. Date: May 30, 2013

(65) Prior Publication Data
US 2014/0300296 A1    Oct. 9, 2014

(30) Foreign Application Priority Data

Nov. 23, 2011   (DE) .......................... 10 2011 119 207

(51) Int. Cl.
*H02P 7/00*    (2006.01)
*H02P 5/74*    (2006.01)
(Continued)

(52) U.S. Cl.
CPC ................. *H02P 5/74* (2013.01); *B60W 50/06* (2013.01); *B60W 30/184* (2013.01);
(Continued)

(58) Field of Classification Search
USPC ............ 318/685, 635, 561, 400.22, 434, 650, 318/474; 355/75, 72, 53, 77, 62; 700/45, 33
See application file for complete search history.

(56) References Cited

U.S. PATENT DOCUMENTS 4,896,090 A * 1/1990 Balch et al. ..................... 318/52
6,909,959 B2 * 6/2005 Hallowell ....................... 701/88
(Continued)

FOREIGN PATENT DOCUMENTS

DE    100 54 368    5/2002
DE    102004006023  9/2004
(Continued)

OTHER PUBLICATIONS

International Search Report issued by the European Patent Office in International Application PCT/EP2012/004480 on Jan. 15, 2013.

*Primary Examiner* — Kawing Chan
*Assistant Examiner* — Jorge L Carrasquillo
(74) *Attorney, Agent, or Firm* — Henry M. Feiereisen LLC

(57) ABSTRACT

A method for controlling the operation of an arrangement of at least two electric machines coupled to different wheels of a motor vehicle and connected to a battery which provides an actual minimum and maximum limiting current for the electric machines. Desired torques are provided for the electric machines by a drive control logic. A desired current resulting from the desired torque is ascertained for each electric machine, and the sum of the desired currents are compared with the maximum and minimum limiting current. If the sum lies outside an interval defined by the limiting currents, the desired currents are adjusted using at least one change rule such that the sum of the desired currents lies within the interval. Adjusted desired torques are determined from the adjusted desired currents and used to control the electric machines.

7 Claims, 2 Drawing Sheets

(51) Int. Cl.
    *B60W 50/06*     (2006.01)
    *B60W 30/184*     (2012.01)
    *B60W 50/00*     (2006.01)

(52) U.S. Cl.
    CPC . *B60W 2050/0012* (2013.01); *B60W 2510/244* (2013.01); *B60W 2510/246* (2013.01); *B60W 2710/083* (2013.01); *B60W 2720/406* (2013.01)

(56) References Cited

U.S. PATENT DOCUMENTS

| | | | |
|---|---|---|---|
| 8,138,720 B2 * | 3/2012 | Snyder et al. | 320/127 |
| 2003/0045978 A1 | 3/2003 | Chandy | |
| 2004/0160201 A1 | 8/2004 | Rahman et al. | |
| 2005/0264102 A1 | 12/2005 | Tezuka | |
| 2006/0145644 A1 * | 7/2006 | Hommi et al. | 318/434 |
| 2008/0059022 A1 | 3/2008 | Shimodaira et al. | |
| 2010/0066288 A1 | 3/2010 | Williams | |
| 2010/0160111 A1 * | 6/2010 | Yamanaka et al. | 477/45 |
| 2013/0035838 A1 | 2/2013 | Maier et al. | |

FOREIGN PATENT DOCUMENTS

| | | |
|---|---|---|
| DE | 102007056301 | 5/2009 |
| DE | 102009030816 | 11/2010 |
| DE | 102010007891 | 8/2011 |
| EP | 2 383 141 | 11/2011 |
| GB | 2 371 631 | 7/2002 |
| JP | 03-276573 | 12/1991 |

* cited by examiner

METHOD FOR CONTROLLING THE OPERATION OF AN ARRANGEMENT OF AT LEAST TWO ELECTRIC MACHINES, AND MOTOR VEHICLE

CROSS-REFERENCES TO RELATED APPLICATIONS

This application is the U.S. National Stage of International Application No. PCT/EP2012/004480, filed Oct. 26, 2012, which designated the United States and has been published as international Publication No. WO 2013/075778 and which claims the priority of German Patent Application, Serial No. 10 2011 119 207.0, filed Nov. 23, 2011, pursuant to 35 U.S.C. 119(a)-(d).

BACKGROUND OF THE INVENTION

The invention relates to a method for controlling the operation of an arrangement of at least two electric machines which are coupled for movement with different wheels of the motor vehicle and are connected to a battery, which battery provides an actual minimum and an actual maximum limiting current for the electric machine provides, wherein desired torques for the electric machines are provided by a drive control logic. In addition, the invention relates to a motor vehicle.

Drive arrangements have been proposed in the technical field of motor vehicles for both all-electric vehicles and hybrid vehicles, which assign an electric machine to at least two wheels of an axle of the motor vehicle, in particular to all four wheels, so that the wheels of the motor vehicle arranged on the same axle can be driven independently. Intentionally accelerating individual wheels is useful when operating some driver assistance systems, such as anti-lock braking systems, anti-slip systems, electronic stability control systems, vehicle dynamics systems and the like. In particular, however, it is also conceivable to realize a steering operation by an appropriate activation of the electric machine. For example, the drive torque can be reduced on one side by a predetermined value and increased on the other side by a predetermined value so as to produce a steering action. Such an approach is known in the art as electric torque vectoring, eTV, and distribution of the driving dynamics in the transverse direction.

Such a motor vehicle, wherein a corresponding electric machine is associated with the drive wheels of an axle, is known, for example, from DE 10 2007 056 301 A1. Therein, the drive wheels of the axle can be independently driven or independently regeneratively braked. The electric machines are used for generating specific drive torques or braking torques whereby an actively controllable transverse torque distribution can be implemented at the first axle for stabilizing the vehicle in critical situations.

However, problems always occur with electric torque vectoring in such an environment, when the battery used to drive the electric machines, especially a high-voltage battery, is full or empty, i.e. when the battery assumes particular states of charge where the charge or discharge current is severely limited. In this situation, an excessive charge current may occur when the battery is, for example, full, posing a risk for the battery. A similar problem may occur when the battery is empty or almost empty, when an excessive energy demand exists in the system. As a result, the driving dynamics cannot be distributed in the transverse direction (electric torque vectoring) when the battery is either full or empty. In hybrid vehicles, such problem preventing the distribution of the driving dynamics in the transverse direction may also occur when the battery is very cold or very hot, i.e. when the battery temperature falls below or exceeds certain limiting temperatures, since the charge or discharge current is then also very limited. This problem does not occur in all-electric vehicles, because these are unable to drive with a cold battery.

Electric machines associated with the same axle of a motor vehicle are usually controlled by a drive controller by identifying desired torques to be generated at the electric machines. As part of controlling the electric machines, a current is then "predicted" (current forecast) for the electric machines so as to realize these desired torques. It may be possible in a simple embodiment, whenever a battery driving an electric machine is full, to predict the actual current of the opposite electric machine as an additional generator current through appropriate communication in the drive system, whereas when the battery is empty and the electric machine is in regeneration mode, the generated actual current of the opposite electric machine can be predicted as an additional motor current. The actual currents are thus shifted so that the control delay caused by the communication is always on the non-critical side of the battery current. However, there is the serious disadvantage in that control delays occur as a result of the time taken up by the bus communication, which can lead to unintended effects and to a reduction of the comfort.

SUMMARY OF THE INVENTION

It is therefore the object of the invention to provide a method which allows a more dynamic, in particular a faster control of the electric machines, without exceeding the battery current limits, in particular in the field of distributing the vehicle dynamics in the transverse direction.

This problem is solved in the present invention with a method of the aforedescribed type by determining a desired current resulting from the desired torque for each electric machine and by comparing the sum of the desired currents of electric machines with the maximum and minimum limiting current, wherein when the sum lies outside the interval defined by the limiting currents, the desired currents are adjusted based on at least one change rule so that the sum of the desired currents is within the limiting currents, and desired torques are determined from the adjusted desired currents which are then used to control the electric machine.

The inventive method, which may of course be performed automatically, may be implemented, for example, in a drive controller. Once the desired torques for the electric machine have been determined by the control logic, wherein in particular two electric machines associated with a single axle or four electric machines, with two of the electric machines associated each axle, a current required to produce this desired torque is determined therefrom. Before the electric machines are actually controlled, it is checked whether battery current limits, i.e. the limiting currents, are exceeded or undershot, meaning that it is checked whether the sum of the desired currents of electric machines lies within the interval spanned by the maximum and minimum current limit. When the limiting currents exceed the maximum limiting current or fall below the minimum limiting current, the desired currents are adjusted based on at least one change rule—again before the electric machines are controlled—so that the sum of the desired currents lies in the interval spanned by the limiting currents. Here, the change rules should be selected so that the most comfortable behavior of the motor vehicle is possibly obtained, which at the same time corresponds to the operator commands of a driver, as will be discussed in more detail below. Adjusted desired torques which are used for the actual control of electric machines can now be determined from the changed desired currents.

The inventive method hence allows control of the electric machines which takes into account from the onset the battery limiting currents by adjusting the desired torques with respect to the limiting currents of the battery, thus enabling a more dynamic implementation of the control, in particular for distributing the driving dynamics in the transverse direction, by eliminating the time delay caused by a bus communication. The inventive method can be easily implemented, since it ultimately represents only an additional processing step, in particular in the completion of the processing chain. In particular, the actual limiting currents of the battery are usually delivered via a bus that is already installed in the motor vehicle, in particular a CAN bus or a FlexRay bus.

In an advantageous embodiment of the present invention, at least one characteristic curve field may be used to convert desired currents into desired torques and vice versa. Characteristic curve fields may be provided in particular in the drive controller for enabling a conversion of the desired torque into a current necessary to produce the desired torque. Such characteristic curve fields, also referred to as characteristic efficiency curve fields, can be easily determined, when the properties of the electric machines are known, which are usually already known and available anyway, in particular in the power electronics associated with the electric machine. It is particularly advantageous when the characteristic curve field is a function of at least one further operating parameter of the electric machine, in particular of a voltage level and/or a rotational speed. Consideration of the actual voltage level and the rotational speed is usually sufficient for converting desired torques into desired currents with sufficient accuracy. The more accurate the conversion of desired torques into desired currents is, the more accurately the limiting currents of the battery can be satisfied.

In another embodiment of the present invention, for each electric machine, in particular in each processing unit associated with an electric machine, a maximum and a minimum possible limit torque of the electric machine may be determined by taking into consideration operating parameters of the electric machine, in particular parameters relating to the temperature of the electric machine and/or a power electronics of the electric machine and/or the performance of the electric machine, wherein the desired torque is set to the exceeded limit torque when the limit torque supplied by the control logic is not within of the desired limit torques. In this case, further information is additionally supplied by the electric machines, which specifies the maximum and minimum possible torque regardless of the actual battery current limits and depending only on the physical limits of the electric machines, especially the temperatures. Such limit torques may be determined by the power electronics themselves, which in particular includes a converter for asynchronous electric machines, and provided the drive controller as a torque forecast. In a particularly advantageous embodiment, the theoretically possible maximum current and the theoretically possible minimum current (charging current) of the battery may also be considered when determining the limit torques. These theoretical maximum and minimum currents the high-voltage battery, which may also be referred to as a "catalog value", are hereby transmitted via the bus, so that they can be used in particular in a controller of the electric machine itself so as to always indicate the maximum or minimal possible limit torque within the torque prediction, which is therefore independent of the actual battery limits and dependent only on the current state of the electric machine. This limit torques can then be used to already realize a preliminary restriction on the power options and the current state of electric machine. However, this is not absolutely necessary, since the "catalog value" may be exceeded, for example, when the theoretically possible maximum current is drawn form the battery and current is additionally supplied by the other electric machine or other so that the sum of the currents exceeds the theoretically possible maximum current.

Furthermore, in particular as part of a steering effect to be generated by the control of the electric machine, the change rule may represent maintaining a steering effect produced by controlling the electric machine and/or maintaining a total torque, and/or optimizing, in particular, weighted criteria with respect to maintaining a steering effect produced by controlling the electric machine and/or maintaining a total torque. Especially in view of distribution of the driving dynamics in the transverse direction, with which a steering effect to be achieved, the change rules may for example provide that the distribution of the driving dynamics in the transverse direction is not affected by a current control that may be necessary, but that only the vehicle drive torque resulting from the sum of the individual torques of the electric machines is affected. However, it is also conceivable to be guided by the total torque so as to prevent a decrease in the speed of the motor vehicle or the like; finally, an optimization method may be provided that is weighted to attempt to at least partially satisfy both demands.

In addition to the method, the present invention also relates to a motor vehicle, which includes an arrangement of at least two electric machines which are coupled for movement with different wheels of the motor vehicle and which are connected to a battery, and a drive controller controlling the operation of the electric machines and configured to carry out the method of the invention All embodiments with respect to the inventive method can be applied likewise to the motor vehicle according to the invention, so that the advantages of the present invention can also be obtained with the motor vehicle.

The method according to the invention, in particular when realized in the motor vehicle according to the invention, allows to suitably shift currents already in theory and before the controller takes over in order to meet the limiting currents of the battery. Because all the electric machines are connected in such a way that they are commonly connected to the battery, the currents are equalized also in practice so that of the previously determined total current is realized.

BRIEF DESCRIPTION OF THE DRAWING

Further advantages and details of the present invention will become apparent from the exemplary embodiments described hereinafter and from the drawing. The drawing shows in.

DETAILED DESCRIPTION OF PREFERRED EMBODIMENTS

Figure 1:
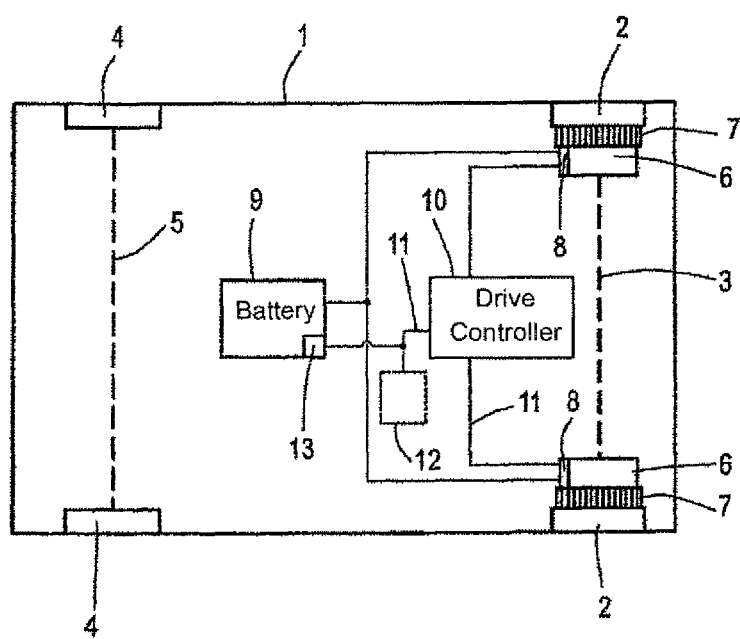
FIG. 1 a schematic diagram of a motor vehicle according to the present invention, and FIG. 2 a flow diagram of the method according to the present invention.

FIG. 1 shows a schematic diagram of an exemplary embodiment of the motor vehicle 1 according to the invention. This motor vehicle is in the present example an all-electric vehicle; however, the present invention can also be implemented in hybrid motor vehicles.

The vehicle has two wheels 2 of a front axle 3 and two wheels 4 of a rear axle 5. An electric machine 6 is associated with each wheel of the front axle 3, wherein the electric machine is coupled for movement with the wheels 2 by way of a movement coupling device 7, in particular a gearbox, and it thus able to drive the wheels 2 or to generate current in generator mode based on a movement of the wheels 2. The electric machines 6 are connected to the battery 9, here a high-voltage battery, via power electronics 8, which also includes a controller for the electric machines 6. In the present example, the electric machines 6 are implemented as asynchronous machines, so that the power electronics 8 includes a corresponding inverter.

The operation of the illustrated drive arrangement is controlled by a drive controller 10, which can exchange data with the electric machines 6 and other vehicle systems indicated with 12 via a schematically depicted vehicle bus 11.

The battery 9 has likewise a battery controller 13, which can communicate with the drive controller 10, the electric machines 6 and other vehicle systems 12 via the vehicle bus 11. The battery 9 provides via the vehicle bus 11 both its theoretical maximum current and its theoretical minimum current (catalog values) as well as actual maximum and minimum limiting currents, which are particularly dependent on the state of charge of the battery 9.

Figure 2:
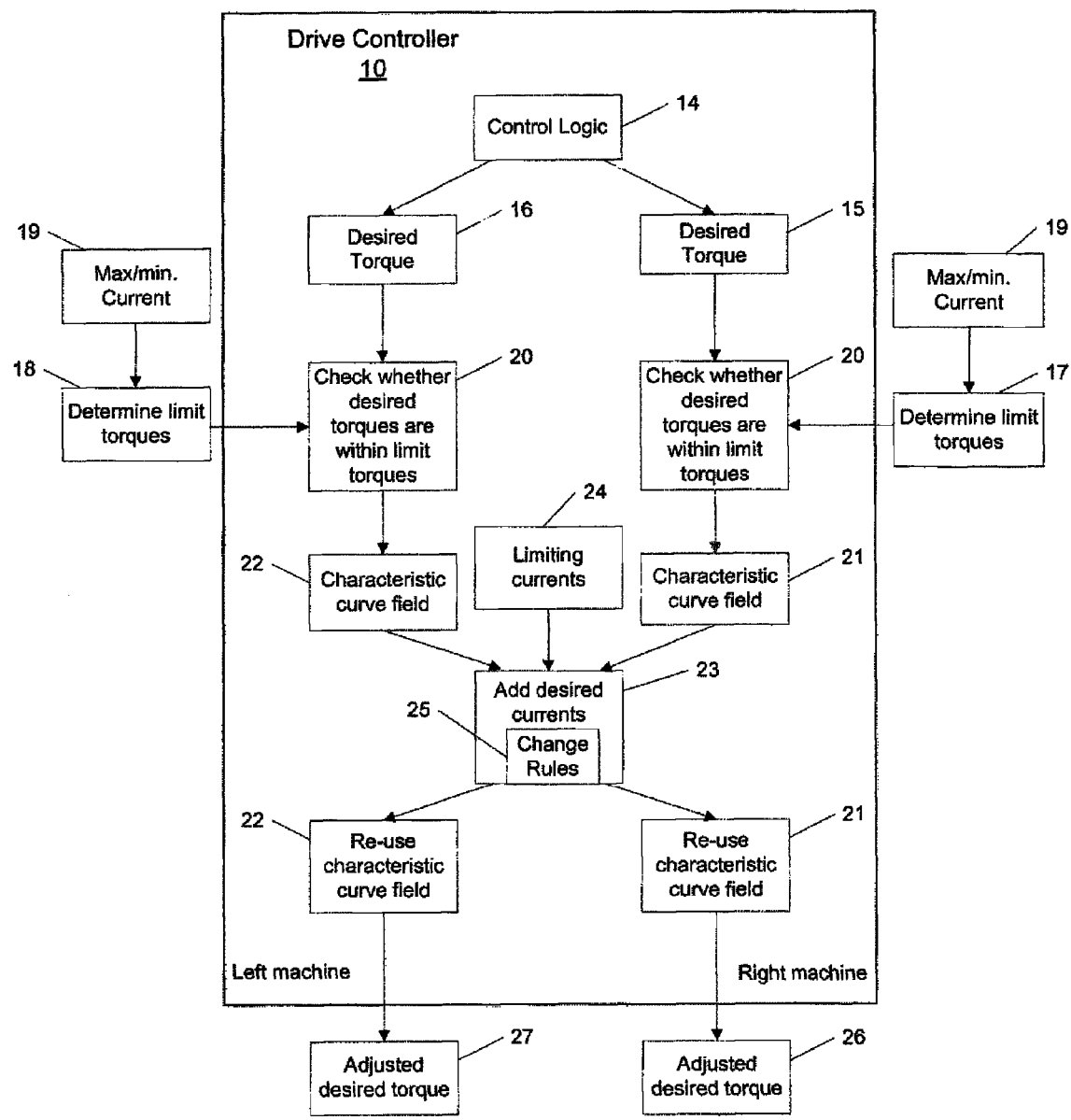

The drive controller 10 is constructed to perform the method according to the invention which will now be explained in more detail with reference to FIG. 2.

As is generally known, control logic 14 realizable with algorithms and/or hardware is initially provided in the drive controller 10, with the output of the control logic 14 representing desired torques 15, 16 for both the left electric machine 6 and the right electric machine 6. At the same time, possible maximum and minimum limit torques 17, 18 for the left and right electric machines 6 are determined by the drive controller 10 itself or directly in the controllers of electric machines 6. This takes into account not only the current state, in particular the thermal situation, of the electric machine 6, in particular also of the power electronics 8, and their performance, but also the aforementioned maximum current and minimum current of the battery 9 symbolized by the boxes 19.

In a step 20, which is identical for both sides, it is then checked whether the respective desired torques 15, 16 lie within the intervals defined by the limit torques 17, 18, wherein the desired torque is reset to the interval boundary when the interval boundaries are exceeded, in order to thus take into account the actual (instantaneous) performance of electric machines 6.

The optionally already adjusted desired torques 15, 16 are then converted by way of characteristic curve fields 21, 22 into the desired currents required to produce the desired torques. The characteristic curve fields also take into account the voltage level and the rotation speed of the electric machines.

In a step 23, the determined desired currents are now added, whereafter it is checked whether the sum current is within the interval described by the limiting currents 24 supplied by the battery 9, i.e. the actual limiting currents, in particular depending on the state of charge. If this is the case, the desired torques 15, 16 remain unchanged. However, when one of the limiting currents 24 is exceeded or undershot, i.e. when the sum current lies outside the interval spanned by the limiting currents 24, then the desired currents are adjusted by taking into account change rules 25.

In the present exemplary embodiment, the change rules are designed so that a steering effect produced by the control of the electric machines 6 is maintained, which ultimately results in a change in total drive torque of the electric machines 6.

However, the change rules may also be deigned differently, in particular with respect to an optimization, wherein for example the criteria "maintaining a steering action produced by control of the electric machines" and "maintaining a total torque" may be include weighting. Corresponding change rules are conceivable also for control operations that are not intended to produce a steering effect, i.e. that do not include a distribution of the driving dynamics in the transverse direction.

An adjusted desired torque 26, 27 can be determined from the possibly changed desired currents based on the re-used characteristic curves 21, 22, which is then used for the actual control of electric machines 6, so that as a result the limiting currents 24 of the battery 9 are not exceeded or undershot.

It should be noted at this point that embodiments are also conceivable where electric machines 6 are additionally associated with the wheels 4 of the rear axle 5.

The invention claimed is:

1. A method for controlling an operation of an arrangement of at least two electric machines which are coupled for movement with different wheels of a motor vehicle and which are connected to a battery making available a minimum and a maximum limiting current to the at least two electric machines, the method comprising:
   with a drive control logic, providing desired torques for the at least two electric machines,
   determining for each electric machine a maximum and a minimum possible limit torque of the electric machine by taking into account as operating parameters of the electric machine at least one of a temperature of the at least two electric machines, a power electronics system of the at least two electric machines and parameters relating to performance of the at least two electric machines, and when the desired torques provided by the control logic does not lie within the limit torque for each electric machine, setting the desired torques to the limit torque that has been exceeded,
   determining from the set desired torques a resulting desired current for each of the at least two electric machines,
   comparing a sum of the desired currents of the at least two electric machines to the maximum and the minimum limiting current,
   when the sum lies outside an interval defined by the maximum and minimum limiting currents, adjusting the desired currents while maintaining at least one of a steering action to be produced by controlling the at least two electric machines and a total torque so that the sum of the desired currents lies within the interval defined by the maximum and minimum limiting currents,
   determining adjusted desired torques from the adjusted desired currents, and
   controlling the at least two electric machines with the adjusted desired torques.

2. The method of claim 1, further comprising converting the desired currents into the desired torques, and vice versa, based on at least one characteristic curve field.

3. The method of claim 2, wherein the characteristic curve field depends from at least one additional operating parameter of the electric machines representing at least one of a voltage level and a rotational speed.

4. The method of claim 1, wherein the maximum and the minimum possible limit torque are determined in a corresponding processing unit associated with the at least two electric machines.

5. The method of claim 1, wherein a theoretically possible maximum current and a theoretically possible minimum current supplied by the battery are taken into account when determining the limit torques.

6. The method of claim 1, wherein the produced steering action and the total torque are maintained through weighted optimization.

7. A motor vehicle, comprising
an arrangement of at least two electric machines coupled for movement with different wheels of the motor vehicle and connected to a battery making available a minimum and a maximum limiting current to the at least two electric machines, and
a drive controller which controls operation of the at least two electric machines and is configured to
provide desired torques for the at least two electric machines,
determine for each electric machine a maximum and a minimum possible limit torque of the electric machine by taking into account as operating parameters of the electric machine at least one of a temperature of the at least two electric machines, a power electronics system of the at least two electric machines and parameters relating to performance of the at least two electric machines, and when the desired torques provided by the control logic does not lie within the limit torque for each electric machine, setting the desired torques to the limit torque that has been exceeded,
determine from the set desired torques a resulting desired current for each of the at least two electric machines,
compare a sum of the desired currents of the at least two electric machines to the maximum and the minimum limiting current,
when the sum lies outside an interval defined by the maximum and minimum limiting currents, adjust the desired currents while maintaining at least one of a steering action to be produced by controlling the at least two electric machines and a total torque so that the sum of the desired currents lies within the interval defined by the maximum and minimum limiting currents,
determine adjusted desired torques from the adjusted desired currents, and
control the at least two electric machines with the adjusted desired torques.

* * * * *